Feb. 13, 1945.　　　　C. H. WHITE　　　2,369,508
FERTILIZER DISTRIBUTOR
Filed Jan. 31, 1941　　　3 Sheets-Sheet 1
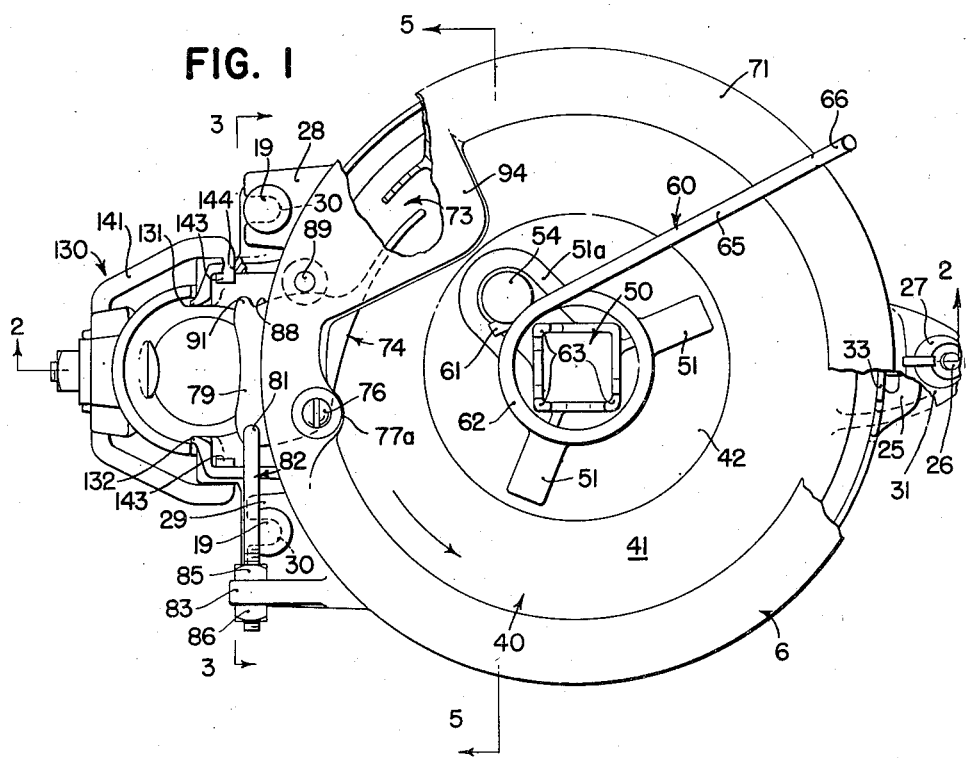
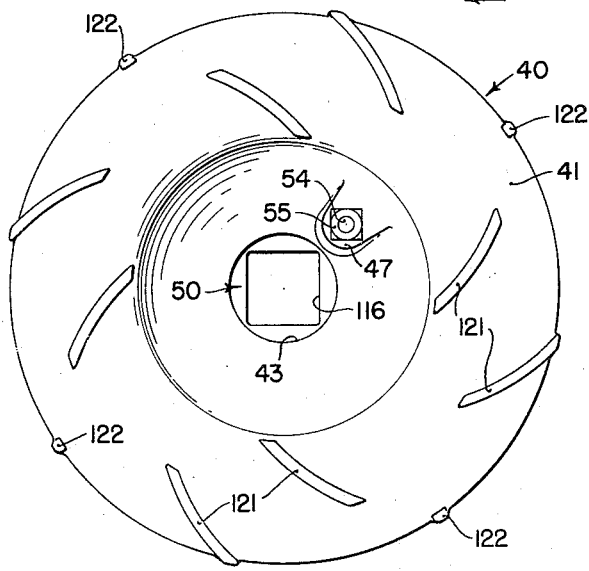
INVENTOR.
CHARLES H. WHITE
BY
ATTYS.

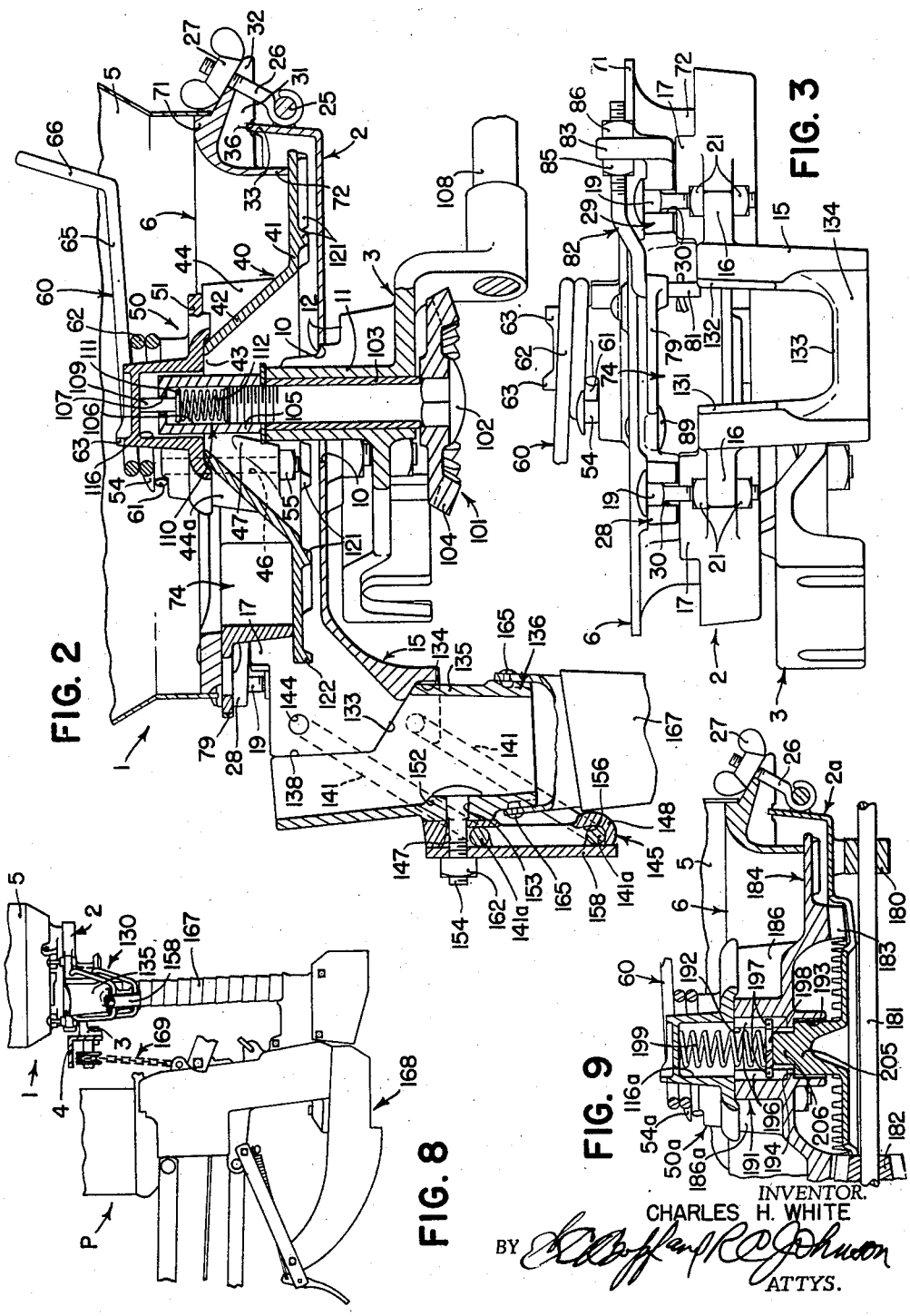

Feb. 13, 1945.  C. H. WHITE  2,369,508

FERTILIZER DISTRIBUTOR

Filed Jan. 31, 1941  3 Sheets-Sheet 3

INVENTOR.
CHARLES H. WHITE
BY *Boff and RC Johnson*
ATTYS.

Patented Feb. 13, 1945

2,369,508

UNITED STATES PATENT OFFICE 2,369,508

FERTILIZER DISTRIBUTOR

Charles H. White, Moline, Ill., assignor to Deere & Company, Moline, Ill., a corporation of Illinois Application January 31, 1941, Serial No. 376,751

19 Claims. (Cl. 222—227)

The present invention relates generally to agricultural machines and particularly to distributing mechanism especially adapted to serve as an attachment for distributing fertilizer during planting of seed or when side dressing row crops.

The object and general nature of the present invention may be said to lie in the provision of a fertilizer hopper bottom ring and base construction in which is incorporated improved driving means which includes spring pressed mechanism for holding a fertilizer feed plate up against the lower edge of the bottom ring and the adjustable feed gate carried by the latter, together with improved agitating means fixed to the fertilizer feed plate by a part of the mechanism cooperating with the spring pressed means for holding the plate up against the lower edge of the hopper, and improved quick detachable means which is adjustable to the proper position facilitating attachment and removal of the hopper but without incurring leakage of fertilizer between the bottom of the hopper and the feed plate, due to the aforesaid spring pressed means holding the feed plate up against the hopper bottom ring in any position of adjustment of the quick detachable connecting means. Further, it is a feature of this invention to provide ribs on the bottom of the spring pressed feed plate so as to work the fertilizer that does get below the plate outwardly toward the spout of the hopper base.

More specifically, it is a feature of this invention to provide resilient means for holding the feed plate of the hopper up against the hopper bottom ring, which resilient means is enclosed so that there is no likelihood of fertilizer working its way into the mechanism and interfering with its smooth operation. Further, in this connection it is another feature of this invention to provide biasing means for holding the plate up in position, which biasing means is so constructed and arranged that the parts of the hopper are readily removable for cleaning without disturbing the biasing mechanism.

Another feature of this invention is the provision of improved agitating means, preferably in the form of a spring arm having a coil section at one end and arranged so that the normal resistance of the fertilizer acts to wind or tighten the coil section on the supporting and rotating part. This arrangement of the spring wire agitator results in the effective length of the spring arm being reduced when greater resistance is encountered, whereby the spring wire agitator remains operative at all times. Another feature of this invention is the provision of an extension on the hopper bottom ring over the adjustable gate so as to prevent fertilizer from flowing directly out through the gate opening when the machine is standing still, and a still further feature of this invention is the provision of means for adjusting the position of the feed gate in an infinite number of positions so as to provide an accurate positive control of the quantity of material discharged from the hopper.

It is also a feature of this invention to provide an improved quick detachable connection between the fertilizer hopper and the hopper base so arranged that by loosening only one part the hopper may be readily removed from the base for cleaning and other purposes. Particularly, it is a feature of this invention to provide a pair of anchoring bolts adjustably fixed to the base and disposed so that by merely engaging a pair of slotted lugs therewith and swinging the hopper into position, a single wing nut may be tightened to not only secure that part of the hopper bottom ring in place but also to tighten the lugs against the anchoring bolts, the latter being adjustable so as to accommodate for wear, manufacturing variations, and the like.

Another feature of this invention is the provision of improved spout means associated with the hopper base adjacent the quick detachable anchoring lugs and so constructed that raising the fertilizer furrow opener when the fertilizer tube is filled or substantially filled with fertilizer will not cause damage to any of the parts.

These and other objects and advantages of the present invention will be apparent to those skilled in the art after a consideration of the following detailed description, taken in conjunction with the accompanying drawings.

In the drawings:

Figure 1 is a plan view of a fertilizer distributing hopper construction in which the principles of the present invention have been incorporated;

Figure 2 is a sectional view taken generally along the line 2—2 of Figure 1;

Figure 3 is a view taken generally along the line 3—3 of Figure 1, showing the anchoring bolts of the quick detachable connection for the hopper bottom;

Figure 4 is a view showing the ribs on the under side of the fertilizer feed plate;

Figure 8 is a fragmentary view showing the fertilizer attachment secured in place on a planter; and Figure 9 is a fragmentary sectional view, similar to Figure 2, showing a modified means for resiliently holding the feed plate up against the hopper bottom ring.

Figure 5:
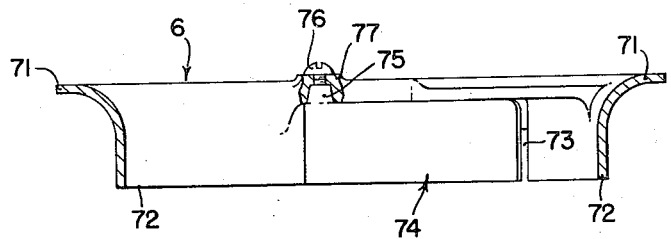
Figure 5 is a fragmentary view, taken generally along the line 5—5 of Figure 1, showing the adjustable gate.

Referring now more particularly to Figures 1 and 2, the reference numeral 1 indicates a hopper for fertilizer and the like, forming a part of an agricultural machine, such as a planter P (Figure 8). The hopper 1 is supported on a base 2 and the latter in turn is carried upon a suitable bracket 3 fixed to the planter or frame 4. The hopper 1 includes a fertilizer can 5 to the lower end of which a hopper bottom ring 6 is fixed in any suitable manner. The hopper base 2 comprises a flat member and includes a central opening 10 through which the bearing sleeve section 11 of the bracket 3 extends. Shouldered portions 12 are formed on the bearing section 11 or on the bracket 3 so as to receive various kinds of hopper bases, as desired. The base 2 also includes a spout section 15 on opposite sides of which apertured lugs 16 are disposed, and adjacent the lugs 16 are abutment flange sections 17, the purpose of which will appear later. A pair of anchoring bolts 19 are disposed, respectively, in the lugs 16, and each bolt has a pair of lock nuts thereon, one above and one below the associated lug 16. The lock nuts are indicated by the reference numeral 21. As best shown in Figure 3, the anchoring bolts 19 extend upwardly above the lugs 16 and above the upper edges of the flanged abutment sections 17, the exact extent of which may be adjusted by loosening one lock nut and tightening the other. On the side of the hopper base 2 opposite the lugs 16 and flanges 17, is an apertured lug 25 in which a bolt 26 is swiveled. The latter carries a wing nut 27.

The hopper bottom ring 6 carries a pair of lugs 28 and 29, each of which is provided with a slot 30, the open end of which faces rearwardly or toward the spout section of the hopper base. At the other side of the hopper bottom ring 6 the latter carries a lug 31 which is provided with a slot 32, the open end of which faces forwardly and in a position to receive the swivel bolt 26 which is carried by the hopper base. The latter also carries an abutment flange section 33 which the lower surface of the forward lug 31 on the hopper bottom ring 6 engages.

The structure just described comprises a quick detachable connection between the hopper and the hopper supporting base or bracket 2. The fertilizer can and the hopper bottom ring constitute in effect one part which frequently requires removal for cleaning and other purposes. In the present instance, the removal of the hopper is readily effected merely by loosening one part, namely, the wing nut 27. When the latter part is loosened, the swivel bolt 26 may be turned out of the slotted lug 31, and then the can and hopper ring may be tilted slightly and then withdrawn from under the heads of the anchoring bolts 19, whereupon the entire hopper is detached from its supporting base. The hopper may be readily attached in the same way, namely, merely by inserting the slotted lugs 28, 29 under the bolt heads 19 and then swinging the hopper can down into position against the abutment flanges 17 and 33 and then swinging the swivel bolt 26 up into the slot 32 and tightening the wing nut 27. This form of quick detachable connection has the advantage that incrusted fertilizer is not likely to interfere with the ready detachment of the hopper, since the act of swinging the hopper ring slightly away from the base 2 loosens such incrusted material, and after that it is a simple matter to withdraw the slotted lugs from the bolts 19. As mentioned above, the latter are adjustable by virtue of their attachment to the hopper base by the two lock nuts 21. It will be seen from Figure 2 that the hopper ring should bear firmly against the abutment flanges 17 and 33. It will also be observed that the swivel bolt 26 serves, in effect, to hold the hopper ring against the forward flange 33 while the anchoring or hinge bolts 19 serve to hold the hopper bottom ring against the rear flanged sections 17. Therefore, the bolts 19 must be adjusted in assembly to a position that will permit the ready attachment of the hopper bottom ring and yet will hold the same firmly against the rear flanges 17 when the hopper is swung down into position with the forward lug 31 engaging the forward flange 33, which occurs when the wing nut 27 is tightened. Ordinarily, no adjustment of the anchoring bolts is ever necessary after the hopper base has been properly assembled, except that possibly some wear may occur at the engaging surfaces of the hopper bottom ring and the edges of the abutment flanges 17 and 33. If such wear does occur, it is a simple matter to readjust the anchoring bolts 19 so as to lower the heads slightly. The under surface of the forward lug 31 is notched, as at 36, so as to engage the forward flange 33 on opposite sides thereof. This has the advantage that the hopper is held in the proper position against lateral shifting even though the anchoring bolts 19 do not for some reason hold the rear portion of the hopper bottom ring tightly against the rear flanges 17 when the wing nut 27 is tightened.

From the above description of the quick detachable means for clamping the hopper onto the hopper supporting base 2, in which the rear slotted lugs and the anchoring bolts serve as separable hinge means, it will be seen that the vertical position of the hopper bottom ring 6 relative to the base may vary, either due to manufacturing variations or due to wear and subsequent readjustment of the bolts 19. According to the present invention, the fertilizer feed plate, which is a rotatable part in the bottom of the hopper, is particularly constructed so as to accommodate such variations in the position of the hopper and at the same time preventing any objectionable leakage of fertilizer so that, under the control of gate mechanism also particularly constructed to cooperate with the fertilizer feed plate, exceptionable accuracy is secured in the distribution of relatively small amounts of fertilizer, in the neighborhood of twenty-five pounds per acre or less.

First, the fertilizer feed plate arrangement, which is particularly constructed to cooperate with the hopper bottom ring arrangement set forth above, will be described.

Referring more particularly to Figures 2 and 4, the fertilizer feed plate, which is indicated in its entirety by the reference numeral 40, comprises a circular section 41 and a conical central section 42 which terminate in a relatively large opening 43. The upper surface of the circular section 41 is smooth but the conical central section 42 is provided with a plurality of fins 44 disposed generally in radial planes with respect to the axis of rotation of the feed plate 40. One of the fins, indicated by the reference numeral 44a, is of sufficient thickness to accommodate a bolt hole 46 therein, the under side of the conical section 42 at this point having an apertured lug 47 in which the aperture constitutes an extension of the bolt hole 46 extending through the fin 44a. The upper edges of the fins 44 and 44a lie in substantially the same horizontal plane. A cap member 50 is adapted to be secured to the plate 40, and to this end is provided with a plurality of radial extensions 51 and 51a. Each of these extensions is grooved so as to fit snugly down over and to embrace the upper edges of the fins 44 and 44a. Similarly, the lower edge of the main body of the cap member 50 fits down over the upper edge surrounding the opening 43, as best shown in Figure 2. The cap member extension 51a is apertured so as to receive an attaching bolt 54 which extends down through the aligned openings in the fin 44a and the lug 47. A nut 55 on the lower end of the bolt 54 when tightened serves to firmly clamp the cap member 50 to the plate 40 so as to form, in effect, a part thereof.

A spring wire agitator, indicated in its entirety by the reference numeral 60, is mounted on the cap member 50 and has an end 61 disposed underneath the head of the bolt 54 so that when the latter is tightened the agitator 60 is firmly fixed to the cap member 50. The agitator 60 includes a coil 62 which encircles the upper part of the cap 50 being centered thereby. To this end, the upper portion of the cap 50 is formed with upwardly directed extensions 63 at the corners of the cap, as best shown in Figure 2, these parts varying in height to correspond to the lead of the coiled sections 62. The agitator 60 is formed with a straight or arm section 65 that extends generally radially outwardly and terminates in an upwardly directed end 66. Referring to Figure 1, it will be noted that the coiled section 62 of the spring wire agitator 60 is wound in such a direction, relative to the direction of rotation of the fertilizer feed plate, as indicated by the arrow, so that the resistance of the mass of fertilizer in the can 5 causes the coiled section to tighten and, in effect, permit the arm end 65 to shift backwardly, with some reduction in the effective radial length thereof and thus reducing the load on the spring and preventing stressing the same beyond its elastic limit. An agitator of this kind is especially effective in breaking up solidly packed fertilizer. It does not require excessive torque when starting up after standing.

The fertilizer feed plate 40 and the spring wire agitator 60 are driven by suitable mechanism which connects with the cap member 50 that carries the spring wire agitator, and the driving mechanism includes means for resiliently holding the feed plate 40 up against the lower edge of the hopper bottom ring 6 and the associated adjustable feed gate which forms a part thereof. As best shown in Figure 5, the hopper bottom ring 6 includes a generally horizontal flange section 71 and a generally vertical flange section 72, and the latter is interrupted, as at 73, to form a feed opening in which a gate member 74 is disposed. The latter is mounted for pivotal movement toward and away from a position substantially closing the feed opening 73, and to this end the gate is formed with or carries an apertured section 75 which is tapped and receives a cap screw 76. The latter is inserted through an apertured lug 77 on the hopper ring 6 and formed generally as a radially inwardly directed extension 77a of the horizontal flange section 71. The gate 74 is formed with an outwardly disposed flange or arm 79 which is apertured and receives the down-turned end 81 of an adjusting member 82. The opposite end of the latter member is threaded and is extended through an apertured lug 83 which is formed as an extension of the lug 29. A pair of lock nuts 85 and 86 are disposed on the threaded section of the member 82, and by loosening one nut and tightening the other, the rod member serves to pivot the gate 74 about the cap screw 76 as an axis, thus moving the free end of the gate 74 toward and away from the corresponding edge of the feed opening 73. By opening the gate more fertilizer is permitted to escape through the opening 73, and by swinging the gate closer to the opening 73 the amount of feed is reduced. The outwardly directed flange section 79 of the gate 74 is formed with an arcuate section 88 which moves underneath a stop member 89 carried by the hopper ring 6, and cooperating with the member 89 is a stop lug 91 on the gate 74, providing a definite stop limiting the opening movement of the gate. Disposed above the gate 74 is a horizontal extension 94 of the hopper ring horizontal flange 71. This horizontal extension 94 is disposed above the outer end of the gate but closely adjacent the same and extends circumferentially a sufficient distance so that when the machine is standing fertilizer is not permitted to run in a straight line directly through the feed opening. Thus, when the rotation of the feed plate stops, as when the machine is stopped, the flow of fertilizer is terminated, even though the gate might be in a wide open position. This is due to the provision of the horizontal extension 94 which, in effect, serves as a baffle and prevents fertilizer from feeding generally vertically downwardly to the feed opening, the fertilizer during operation normally feeding in a generally horizontal direction to the feed opening due to the rotation of the fertilizer feed plate and the spring wire agitator carried thereby.

The mechanism for driving the fertilizer feed plate and the spring wire agitator will now be described. The driving mechanism is indicated in its entirety by the reference numeral 101 and includes a bolt 102 carrying a bushing 103 and journaled for rotation in the bearing section 11 of the supporting bracket 3. Disposed between the head of the bolt 102 and the bushing 103 is a driving gear 104 which meshes with a gear (not shown) on the seeding shaft 108 which is generally of conventional construction. The plate driving mechanism includes means, indicated generally by the reference numeral 110, for resiliently holding the feed plate 40 up against the hopper bottom ring 6. To this end, the threaded end of the bolt 102 receives a hollow nut member 105 which is square in cross section and has an internal bore threaded to receive the upper end of the bolt 102. The bore is indicated by the reference numeral 106. The upper end of the nut member 105 is provided with an aperture 107 smaller than the diameter of the bore 106. A pin or plunger 109 extends upwardly through the opening 107 and at its lower end has a head 111 against which a spring 112 disposed in the bore 106 bears. The lower end of the spring 112 reacts against the upper or threaded end of the bolt 102.

As best shown in Figure 2, the spring 112 exerts a continual bias and acts through the plunger pin 109 against the cap 50 of the rotatable feed plate 40 for holding the latter up against the lower edge of the vertical flange section 72 of the hopper bottom ring 6 and against the edge of the shiftable gate 74, the edge of the latter and the lower edge of the hopper bottom ring 6 lying substantially in the same plane in all positions of adjustment. The cap member 50 is formed with a square socket section 116 that receives the square nut member 105, and due to such polygonal co-operating construction, the rotation of the driving mechanism 101 thus rotates the feed plate 40 and associated parts. At the same time, the spring 112 acts to hold the feed plate 40 up against the hopper bottom ring, as just mentioned. It will be noted, particularly from Figure 2, that the cap member 50, firmly secured to and forming a part of the fertilizer feed plate 40, protects the spring biasing mechanism so that it is almost an impossibility for fertilizer to find its way into the spring means that holds the fertilizer plate up against the hopper bottom ring. These parts, therefore, are freely movable during the life of the machine, and it will also be noted that by dropping the pin 109 in the bore 106, and then inserting the spring 112, the spring biasing mechanism will be in active operating position just as soon as the nut member 105 is threaded onto the bolt 102 and down against the bushing 103. When the nut member 105 is tightened firmly, all parts of the driving mechanism by which the drive is transmitted to the fertilizer feed plate 40 are connected together in operating relation. The action of the spring wire agitator 60, which is carried by the rotatable fertilizer feed plate 40, is augmented by the fins 44 and 44a, the fins serving to agitate the central portions of the mass of fertilizer while the outer ends of the spring wire sections 65 and 66 agitate and stir the radially outer portions of the fertilizer mass, so that the same is delivered in a uniform manner through the fertilizer feed opening under the baffle plate section 94.

It will be noted that the spring 112 and associated parts hold the fertilizer feed plate 40 up against the lower edge of the hopper bottom ring 6 and the gate 74 carried thereby, and this takes care of variations in the positions of these parts due to the adjustment of the anchoring bolts 19 to take care of manufacturing and other variations as mentioned above. The socket 116 in the cap member fits with sufficient looseness about the square nut 105 so that the plate 40 may rotate in a plane not exactly normal to the axis of the bolt 102 and bearing 11, yet the spring 112 will continually hold the plate up against the hopper bottom ring 6 and the gate 74. Also, the spring 112 is formed so as to exert a force sufficient to overcome the weight of the fertilizer in the can so that under all conditions of operation the feed plate 40 is held up in place.

Even though the contact of the feed plate 40 with the lower edge of the hopper bottom ring is maintained at all times, it may occur that some fertilizer works its way between the feed plate and the lower edge of the hopper bottom ring. In order to discharge such leakage of fertilizer, the lower face of the fertilizer feed plate 40 is formed with a plurality of short spiral ribs 121 placed as shown in Figure 4. The fertilizer feed plate 40 also has marginal lugs 122 which just clear the vertical flange of the base 2. As best shown in Figure 2, the spring 112 and cooperating parts hold the feed plate 40 in position up against the hopper bottom ring 6 with the lugs or ribs 121 clearing the bottom of the base 2, so that there is no frictional drag at these points. It will be noted that the bearing section 11 extends above the bottom wall of the base 2 so that any fertilizer that leaks around the outer edge of the fertilizer feed plate 40 will not get into the bearing. Instead, during the rotation of the plate 40, the outwardly and downwardly projecting lugs 121 and 122 on the plate 40 serve to work any fertilizer that leaks around under the plate out of the hopper base before it has an opportunity to work into the bearing 11.

The rotatable feed plate 40, the spring wire agitator 60, and the lower spiral ribs 121, all serve to discharge the fertilizer into the spout section 15, the fertilizer moved by the spiral ridges moving directly into the spout section 15 while the fertilizer moved by the fertilizer feed plate 40 and the spring wire agitator 60 moves into the spout section 15 through the adjustable gate opening described above. The spout is particularly constructed of two separable parts one of which is movable upwardly relative to the other part and said one part carrying the fertilizer feed tube so that breakage of parts is not likely to occur if the furrow openers should be raised with hardened fertilizer in the tube, which sometimes occurs if the fertilizer is not cleaned out at the end of the day and left over night.

Figure 6:
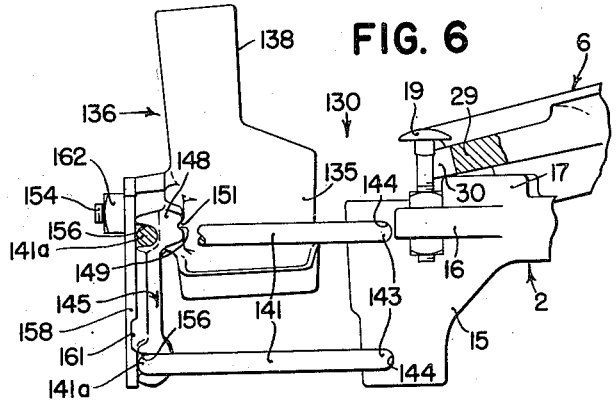
Figures 6 and 7 are side and rear views of the retractable hopper spout.
Figure 7:
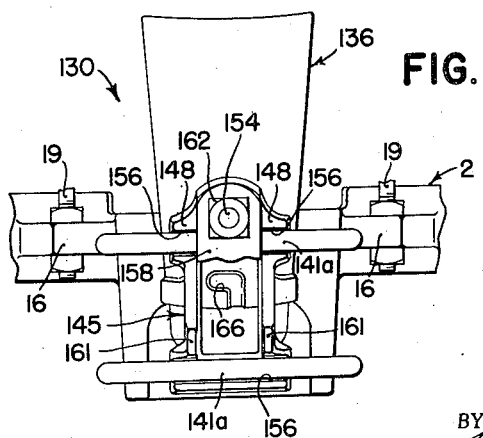

Referring now more particularly to Figures 6 and 7, the spout unit, receiving fertilizer from the distributing mechanism described above, is indicated in its entirety by the reference numeral 130 of which the spout section 15 is a part. The latter section is formed integrally with the base 2 and is essentially a semi-cylindrical part with the open portion facing rearwardly. The semi-cylindrical section 15 is provided with a pair of vertical ribs 131 and 132 (Figure 1) merging into and joining a rib 133 (Figure 2) which is disposed in a downwardly angled plane. The latter rib section 133 overhangs a semi-cylindrical socket 134 into which the lower portion 135 of a companion spout section 136 is adapted to be received, as best shown in Figure 2.

The upper edge of the section 135 is disposed in a plane inclined downwardly and is adapted to fit snugly underneath the rib 133. The remaining upper portion of the spout section 136 is also generally semi-cylindrical with vertical edges 138 adapted to embrace the vertical ribs 131 and 132 formed on the spout section 15. The two spout sections 15 and 136 are normally held together in operating position by a pair of links 141 which are preferably identical in construction. Each link consists generally of a U-shaped part having laterally inturned ends 143 rockably mounted in openings 144 formed in the spout section 15 adjacent the plane of the anchoring bolts 19.

A pivot block 145 is adapted to be secured to the rear portion of the spout section 136, and to this end is formed with an opening 147 at its upper end and a pair of flanking lugs 148 each of which is provided with a V-shaped notch 149. The notches 149 are adapted to engage companion knife edges 151 which are disposed on opposite sides of an apertured boss 152 formed on the lower portion of the spout section 136. The aperture 153 in the boss 152 is square and is adapted to receive the head of a bolt 154 that extends outwardly to receive the opening 147 in the block 145. The latter member is provided with a pair of transverse grooves 156 that receive the central portions 141a of the U-shaped links 141. A strap 158 apertured at its upper end to receive the outer end of the bolt 154, is disposed over the intermediate portions of the U-shaped link members 141 so as to hold them in the block 145. To this end, the latter is provided with a pair of lugs 161 spaced apart to receive the strap 158 therebetween, thus preventing the latter from getting out of position. When the nut 162 on the bolt 154 is tightened, it will be seen that the block 145 is firmly fixed to the spout section 136 so as to form, in effect, a part thereof, and at the same time the strap 158 holds the U-shaped links 141 in position so that the spout section 136 is swingably connected to the hopper base 2.

The openings 144 in the base, in which the laterally inturned ends 143 of the U-shaped links 141 are disposed, are placed above the grooves 156 in which the links 141 are pivotally connected with the spout section 136. Figure 2 shows the parts in operating position, in which it will be noted that the links 141 angle downwardly and rearwardly in directions substantially perpendicular to the plane of the rib 133 and the upper edge of the spout portion 135.

The spout section 136 is provided with a pair of L-shaped recesses 166 by which a fertilizer tube 167 may be releasably connected by pins 165, as is common practice. The lower end of the fertilizer tube 167 discharges fertilizer into a furrow opener 168 of conventional construction, and the furrow opener 168 is adapted to be raised and lowered into and out of transport and operating position by suitable mechanism, of any desired construction, represented by a lifting chain 169. From Figure 8 it can be seen that if fertilizer is left in the tube 167 over night and hardens therein, while at the same time the furrow opener 168 is left in its lowered position, the subsequent actuation of the lifting means 169 and the resulting upward movement of the furrow opener 168 would not be affected by the fact that the fertilizer has hardened in the tube 167 preventing the latter from flexing as is normal. In this event, the upward movement of the furrow opener 168 would act through the tube 167 and the hardened fertilizer therein, against the swingably mounted spout section 136, forcing the same upwardly and laterally outwardly with respect to the hopper base 2, as shown in Figure 6. Thus, the two spout sections 15 and 136 merely separate and no damage occurs to any of the parts. This gives the farmer an opportunity to loosen the fertilizer in the tube 167 to restore the parts to operating condition. Thus, with the fertilizer furrow opener 168 raised, the loosening of the fertilizer in the tube 167 will immediately permit the weight of the spout section 136 to swing the same downwardly from its dotted line position to its full line position, whereupon the unit is ready for operation.

The operation of the fertilizer hopper construction of the present invention is substantially as follows.

The gear 104 is driven in any suitable manner, preferably from the seeding shaft, which drives the seeding mechanism (not shown). Any suitable driving means may be employed, not necessarily associated with seeding mechanism, for sometimes the fertilizer is distributed after the crop has been planted and has come up. The gear 104 acts through the bolt 102 and the nut member 105 at the upper end thereof to rotate the fertilizer feed plate 40, the spring 112 and associated parts carried by the driving mechanism acting against the cap member 50, to which the drive is transmitted, to hold the feed plate 40 up against the lower edge of the hopper bottom ring 6. The rotation of the feed plate also rotates the agitating fins 44 and 44a and the spring wire single arm agitator 60. Even if fertilizer is tightly packed in the can 5, the aforesaid agitating mechanism is operative when the plate 40 is rotated to stir the fertilizer and cause the same to be fed uniformly through the feed opening defined by the gate 74, the spring wire agitator 60 stirring the peripheral portions of the fertilizer mass while the supplementary agitating fins 44 and 44a stir the central portions thereof. If the fertilizer is hardened and the torque on the spring wire member 60 becomes abnormal, the coiled section 62 merely closes up around the upper portion of the cap 50, in effect reducing the radial length of the arm section 65 and thereby reducing the power requirements. Thus, the spring wire agitator can operate under conditions where other agitators might be bent out of shape or broken. The spring 112 hold the fertilizer plate 40 up against the edge of the hopper bottom ring 6 and the edge of the adjustable gate at all times so as to prevent any material amount of leakage of fertilizer around into the bottom of the hopper base 2. Such leakage that does occur is adequately taken care of by the spiral ribs 121 which move any fertilizer in the hopper base outwardly, toward the spout section 15. It will be noted from Figure 4 that the spiral ribs are staggered so as to feed the fertilizer toward the spout but without the likelihood that fertilizer will build up on the bottom of the rotatable plate 40. That is to say, the ribs 121 overlap one another but they do not extend entirely across the lower surface of the plate. In effect, therefore, the ribs are self cleaning and any fertilizer in the bottom of the base 2 is worked outwardly with a sort of oscillation which tends to prevent the fertilizer from building up on the bottom of the rotatable plate. The ribs 121 thus work the fertilizer toward the edges of the plate so that the outer lugs 122 along the periphery of the plate force the fertilizer out into the spout section 15.

The fertilizer can 1 is readily removed from the base 2 merely by loosening the wing nut 27 and swinging the bolt 26 out of the slot in the lug 25, whereupon the can may be tilted slightly and then lifted away from the anchoring bolts 19. The can may be replaced after cleaning by first engaging the slots of the rear lugs 28 and 29 with the bolts 19 and then swinging the can down into position on the abutment flange sections 17 and 33, the spring biased plate 40 yielding to accommodate any particular position of the lower edge of the hopper bottom ring 6 and the shiftable gate 74. The position of the latter may be adjusted within relatively small limits by loosening one of the nuts 85, 86 and tightening the other. When the can 1 is removed, it can be seen, particularly from Figure 1, that the plate 40 may be removed merely by lifting the same from the base 2. The removal of the fertilizer feed plate 40 does not in any way disturb the effectiveness of the spring biased plunger 109, which remains in position at all times. The head 111 on the plunger 109 prevents the spring 112 from forcing the plunger entirely out of the driving member 105, and the tightening of the latter down against the bushing 103 in driving relation serves, in effect, to prestress the spring 112 so that it is effective to hold the fertilizer feed plate 40 up against the bottom of the hopper ring 6 and the adjustable gate 74. The construction of the fertilizer spout in two separable parts and the mounting of one for swinging movement upwardly and away from the other part, eliminates the possibility of damage to parts if the furrow opener should be raised from a lowered position when the fertilizer feed tube is filled or partially filled with fertilizer. The single bolt 154 serves not only to connect the pivot block 145 to the lower spout section 136 but also to fix the attaching strap 158 in position. The V-shaped notches 149 and the cooperating lugs 151 serve to keep the block 145 square with the spout section 136 so that the latter is freely swingable at all times. The lug 152 on the section 136 serves to hold the pivot block 145 away from the lower edge of the section 136 so as to provide ample space to attach the upper end of the tube 167. The free or outer end of the gate 74 moves substantially under the central portion of the baffle plate section 94 so that fertilizer cannot run in a straight line directly downwardly and outwardly through the feed opening in the hopper ring above the feed plate 40. It will be noted, particularly from Figure 1, that the bolt 54 serves the triple purpose of fixing the cap member 50 to the main body of the fertilizer feed plate 40, holding the spring wire agitator to the fertilizer feed plate and transmitting the driving torque to the inner end of the spring wire agitator. The polygonal upper section of the cap member 50 serves to center the coiled section 62 of the spring wire agitator 60 both when the same is relatively unstressed, as when agitating light fertilizer, and when the same is stressed and the coil at least partially closed about the upper part of the cap member 50.

The driving mechanism for the type of hopper and base construction shown in Figure 2, includes a generally vertically arranged member for rotating the feed plate, such vertical member being provided with spring means for yieldingly holding the feed plate up against the hopper bottom ring. Other types of fertilizer hopper and base constructions include a simplified type of drive, in which the plate driving means includes a pinion meshing with gear teeth formed directly on the lower side of the fertilizer feed plate, thereby eliminating the shaft 102 and gear 104 shown in Figure 2. To provide resilient means for holding the feed plate up against the hopper bottom ring for this type of construction, I preferably reverse the arrangement of the parts shown in Figure 2 and arrange the fertilizer feed plate to carry the resilient means, rather than carrying it on the vertical driving part as shown in Figure 2. Referring now to Figure 9, the hopper supporting base 2a is provided with one or more bearing members 180 in which a driving shaft 181 is journaled for rotation. A pinion 182 is fixed to the shaft and meshes with gear teeth 183 formed directly on the fertilizer feed plate, indicated generally by the reference numeral 184. Like the fertilizer feed plate 40 described above, the fertilizer feed plate 184 is provided with a plurality of fins 186, one of the fins 186a being apertured to receive a bolt 54a by which a cap member 50a, preferably identical with the cap member 50 described above, is attached to the plate 184. The latter has a central hub section 191 having a upper bore 192 and a lower bore 193, separated by an interior flange 194. The bore 193 is larger than the bore 192 and the diameter of the opening of the flange 194 is smaller than the diameter of the upper bore 192. The walls of the bore 192 at diametrically opposite points are provided with vertical grooves 196 which receive lugs 197 formed on an axially shiftable plug 198 that is disposed in the bore 192. A spring 199 is disposed between the slidable plug or abutment member 198 and the upper end of the bore 116a formed in the cap member 50a. Otherwise, the construction of the fertilizer feed plate 184 is substantially the same as the plate 40.

The base 2a is formed with a central stud section 205 which terminates upwardly in a reduced end 206 that bears against the slidable washer 198. The dimensions of the parts are such that when the hopper is in place, the stud end 206 presses the part 198 upwardly against the bias of the spring 199, which thus yieldingly holds the feed plate 184 up against the hopper bottom ring. The vertical grooves 196, in which the lugs 197 are disposed, end at the interior flange 194, and thus, as in the form of the invention described above, the fertilizer feed plate 184 may be removed merely by lifting the same out of the base after the hopper is detached, without any danger of the spring mechanism becoming detached from the feed plate. The same may be disassembled, however, merely by taking off the cap 50a. It will also be noted that the spring mechanism 198, 199 is enclosed and entirely protected from the fertilizer.

Reference was made above to the fact that the cap 50a is substantially the same as the cap 50 described above, but it is not essential in the form of the invention shown in Figure 9 to have the interior socket 116a of the cap 50a square in cross section since in this form of the invention it does not perform any function of driving the feed plate, whereas that is its principal function in the form of the invention shown in Figure 2. In Figure 9 it will be seen that the bolt 54a, like the bolt 54 shown in Figure 2, serves to hold the spring agitator in position on the cap of the fertilizer feed plate.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a fertilizer distributor, a base, a hopper bottom ring having a vertical flange section interrupted to form a gate-receiving opening, a gate pivotally connected with the ring and having a lower edge disposed in the same plane as the lower edge of said vertical flange, a fertilizer feed plate engaging the lower edge of said vertical flange and the lower edge of the gate in any adjusted position of the latter, and yielding means acting against said base, resiliently holding said plate up against said lower edges.

2. A hopper construction comprising a base, a hopper, vertically adjustable means securing said hopper to said base, a feed plate, and means resiliently urging said feed plate into engagement with the lower part of said hopper in any adjusted position of said adjustable securing means.

3. A hopper construction comprising a base, a hopper including a bottom ring having a gate opening therein and gate means adjustable relative thereto, vertically adjustable means securing said hopper bottom ring to said base, a feed plate having a cap member, a spring wire agitator including a coiled section encircling a part of said cap member and means fixing the agitator and said cap member to said plate member, driving means on said base engageable with said cap member for rotating said feed plate, spring means for resiliently holding said feed plate in engagement with the bottom ring and associated gate means of said hopper in any adjusted position of said adjustable securing means.

4. In a fertilizer distributor, a hopper bottom ring having a generally vertical flange with a gate opening formed therein, a fertilizer feed plate engaging the lower edge of said flange, a gate pivoted to said flange adjacent one end of said opening, and means for adjusting said gate comprising an apertured lug on said ring, a member connected at one end with said gate at a distance from its pivoted axis and having its other end screw threaded and passing through the aperture in said lug, and a pair of adjusting nuts threaded onto said other end of said adjusting member, one on each side of said lug.

5. In an agricultural machine, a rotatable feed plate, a spring wire agitator having an end extending radially to serve as agitating means, said agitator having a coil formed at one end to increase the flexibility of the agitator, and means for securing said coil end of the agitator to said plate so that the coil of the agitator is disposed substantially coaxially of the axis of rotation of said plate.

6. In an agricultural machine, a rotatable feed plate, a spring wire agitator having one end serving as an agitating means and a coil formed at the other end, and means on said feed plate for connecting the outer end of the coil on said spring wire agitator to said feed plate, the position and lead of said coil being arranged so that the resistance of material against said one end of the agitator tends to tighten the coil.

7. A hopper construction comprising a hopper base, a pair of abutment lugs carred thereby at one side of the base, an abutment lug at the other side of said base, a pair of headed parts carried by said base, a hopper ring having a pair of slotted lugs formed to detachably engage said headed parts, and means adjacent said one lug at the other side of said base and engageable with said ring at the side opposite said slotted lugs and reacting against the latter and the associated headed parts for clamping said hopper ring against said abutment lugs.

8. A hopper construction comprising a base having a flange interrupted at one part to form a discharge opening, a pair of lugs carried by said flange on opposite sides of said opening, anchoring members on said lugs, a hopper bottom ring having parts engageable with said anchoring members, and means cooperating with said anchoring members for clamping said hopper bottom ring to said base against portions of said flange.

9. In an agricultural machine, a hopper having an open bottom, a feed plate comprising two parts, one having a peripheral section and a hollow upwardly extending central section, the latter having an opening, the other part comprising a cap closing said opening, and resilient means disposed within said hollow section and engaging said cap for yieldingly urging said plate up in contact with the edge surrounding the opening of said hopper bottom.

10. In an agricultural machine, a hopper having an open bottom, a feed plate comprising two parts, one having a peripheral section and a hollow upwardly extending central section, the latter having an opening, the other part comprising a detachable cap closing said opening, and driving means extending upwardly within said hollow central section and engaging said cap for driving said feed plate.

11. In an agricultural machine, a hopper base, a hopper carried by the base and having an open bottom supported above said base, driving means on said base, and having a non-circular member at its upper end, a feed plate having a non-circular socket receiving said member to establish a driving relation therewith, there being a sliding adjustment between said socket and driving member, and resilient means for yieldingly urging said plate up in contact with said hopper bottom.

12. In a fertilizer distributor, a hopper base, driving means journaled thereon and having a non-circular member at its upper end, a feed plate comprising two parts, one having a peripheral section and a hollow upwardly extending central section, the latter having an opening, the other part comprising a cap closing said opening, said cap having a non-circular socket receiving said member to establish a driving relation therewith.

13. In a fertilizer distributor, a hopper base, a driving means journaled therein and having an upper threaded end, a non-circular nut member on said threaded end and serving to hold said driving means in position, a feed plate having a non-circular socket receiving said nut member to establish a driving relation therewith, said nut member and socket being relatively movable, and resilient means carried by the driving means for supporting the feed plate thereon.

14. In a fertilizer distributor, a hopper base, driving means journaled thereon and having a non-circular member at its upper end, a feed plate having a non-circular socket receiving said member to establish a driving relation therewith, said member and socket being relatively movable, and resilient means carried by the driving means for supporting the feed plate thereon.

15. A quick detachable hopper construction comprising a hopper base, a hopper bottom ring, vertically adjustable hinge means for connecting said hopper bottom ring to said base at one side thereof, releasable latch means engageable with said ring on the other side of said base, a rotatable feed plate between said base and ring, and yielding means urging said plate against said base for holding the plate up against said bottom ring in different vertically adjusted positions of said hinge means.

16. A hopper construction comprising a base, a hopper including a bottom ring having a gate opening therein and gate means adjustable relative thereto, vertically adjustable means securing said hopper bottom ring to said base, a feed plate between said base and ring, and a spring biased part supporting said feed plate against said base and engageable with the under side of said feed plate for resiliently urging the latter into engagement with the bottom ring and associated gate means of said hopper in any adjusted position of said adjustable securing means.

17. In an agricultural machine, a hopper base, a hopper having a bottom ring connected with said base, a rotatable feed plate engaging the bottom of said ring, a driving part rotatably carried by said hopper base, cooperating means on said feed plate to receive said driving part in telescoping relation, said driving part having an interior recess opening upwardly, a spring disposed in said recess, and a pin slidably carried in axial relation by said part and extending into engagement with said spring in said recess, the upper end of said pin engaging said plate whereby said spring acts through said pin against said plate for holding the same against the bottom of said hopper ring.

18. In an agricultural machine, a feed plate having one or more fins, a driving socket member having extensions cooperating with said fins to position said member on said plate, said fins serving as agitating means, fastening means for fixing said member on said plate, and a spring wire member encircling said member above said fins and having one end secured to said socket member by said fastening means, the other end of said spring wire member extending radially beyond said fins to serve as agitating means.

19. Distributing means including a base having an opening, a hopper having a lower open end and a discharge opening communicating with said base opening, and a rotatable feed plate carried by the base and closing the lower open end of the hopper and adapted to control the flow of material through said discharge opening, said rotatable feed plate having ribs on its lower side and lugs on its periphery radially outwardly of the hopper discharge opening which act, during rotation of the plate, to work material outwardly of and below said plate toward said base opening.

CHARLES H. WHITE.